United States Patent Office 3,356,687
Patented Dec. 5, 1967

3,356,687
DYESTUFFS AND PROCESS FOR
PREPARING THEM
Otto Fuchs and Helmut Tröster, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 3, 1966, Ser. No. 531,359
Claims priority, application Germany, Mar. 6, 1965, F 45,440
6 Claims. (Cl. 260—328)

ABSTRACT OF THE DISCLOSURE

Fluorescent, orange-red dyestuffs of high tinctorial strength and brilliance that are suitable for dyeing synthetic materials such as polyethylene terephthalate, polystyrene, polymethacrylate, polyethylene and polypropylene, said dyestuffs having the formula

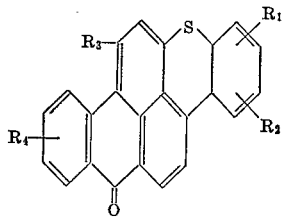

in which $R_1$ and $R_2$ represent hydrogen, chlorine, lower alkyl or lower alkoxy, $R_3$ stands for hydrogen, lower alkyl, lower alkoxy or phenyl and $R_4$ stands for hydrogen, bromine, nitro or hydroxy.

---

The present invention relates to novel water-insoluble dyestuffs and a process for preparing them, in particular, it relates to dyestuffs of the general formula

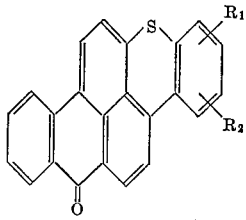

wherein $R_1$ and $R_2$ represent hydrogen or halogen atoms, alkyl, aryl, alkoxy, carbalkoxy, acyloxy or nitro groups, and wherein the benzanthrone nucleus may contain further substituents such as, for example, halogen atoms, alkyl, aryl, hydroxy, alkoxy or nitro groups.

It has now been found that dyestuffs of the abovementioned formula are obtained by heating the diazonium salts of Bz - 1 - (2-aminophenyl-mercapto)-1.9-benzanthrones of the general formula

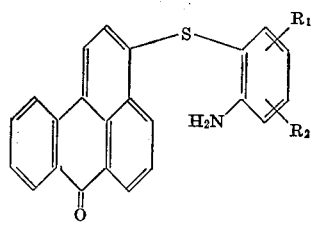

wherein $R_1$ and $R_2$ have the meanings given above and wherein the benzanthrone nucleus may be substituted in the manner described above, in the presence of copper or copper salts.

The cyclization of the thioether, according to the process of the present invention, may be carried out in different manner. The diazonium solution or suspension acidified by acetic or by a mineral acid, may either be allowed to flow into a boiling aqueous neutral, acid or even basic solution of copper salt, or the coupling solution may be mixed with a copper salt solution or with copper powder and the mixture is subsequently heated until the evolution of nitrogen ceases. It is suitable to carry out the cyclization at temperatures ranging from about 70 to 110° C. The dyestuffs thus obtainable according to the process of the invention, may be isolated according to usual methods.

Bz - 1 - (2'-aminophenyl-mercapto)-1.9-benzanthrones used as starting compounds, are obtained in known manner, for example, by condensing Bz-1-bromo- or chloro-1.9-benzanthrones with unsubstituted or substituted o-amino- or o-nitrothiophenols in organic solvents such as ethanol, butanol, dimethylformamide or pyridine, if required, in the presence of agents having alkaline reaction, the o-nitrothioethers formed in the one case, being subsequently reduced to the o-aminothioethers. Said compounds are also obtained by reacting in the same manner Bz-1-mercapto-1.9-benzanthrones with unsubstituted or substituted o-nitrochlorobenzenes and the o-nitroethers obtained are converted into the corresponding amino compounds.

The products obtainable according to the present invention, are novel orange-red dyestuffs which are suitable for dyeing synthetic fibers such as triacetate or polyethylene glycol terephthalate, in particular, as fluorescence dyestuffs for dyeing synthetic materials such as polystyrene, polymethacrylate, polyethylene or polypropylene. They yield reddish orange dyeings of high tinctorial strength and brilliance, which are intensely fluorescing, extraordinarily stable to high temperatures and some of which have a very good fastness to light.

The following examples serve to illustrate the invention, but they are not intended to limit it thereto, the parts being by weight unless otherwise stated:

Example 1

12.5 parts of concentrated hydrochloric acid were allowed to flow into a suspension of 17.6 parts of Bz-1-(2'-aminophenyl-mercapto)-1.9-benzanthrone in 200 parts of glacial acetic acid at 80° C. The hydrochloride formed was diazotized with a solution of 3.6 parts of sodium nitrite in 40 parts of water at 0–5° C. The diazonium solution was subsequently allowed to flow into a boiling solution of 40 parts of copper sulfate in 600 parts of water within 1 hour and the reaction mixture was then kept at the boil for another hour. The carmine-red cyclization product was filtered off with suction, washed with hot water and methanol and dried. The dyestuff obtained with a very good yield, dyed polystyrene and polymethacrylate material reddish orange intensely fluorescing tints of high fastness to light.

*Analysis.*—Calculated: C, 82.2; H, 3.6; S, 9.5. Found: C, 82.3, 82.6; H, 3.7, 3.8; S, 9.4, 9.5.

Example 2

15.3 parts of Bz-1-(2'-aminophenyl-mercapto)-Bz-2-isopropyl-1.9-benzanthrone were suspended in 180 parts of glacial acetic acid and converted into the hydrochloride by adding 10 parts of concentrated hydrochloric acid. After having diluted the reaction mixture with 40 parts of ater, the hydrochloride was diazotized with a solution of 0 parts of sodium nitrite in 40 parts of water at 0–5° C. ad the diazonium solution was subsequently added dropise to 640 parts of a boiling aqueous copper sulfate soluon of 3% strength. The dyestuff which had been isolated a usual manner, dyed structures of polystyrene or polyiethacrylate deep orange-red fluorescing tints of good astness to light.

*Example 3*

A solution of 17.6 parts of Bz-1-(2'-aminophenyl-iercapto)-1.9-benzanthrone in 320 parts of sulfuric acid f 90% strength was diazotized with 15.8 parts of a nirosyl sulfuric acid of 40% strength at 0–5° C. The iazonium solution was subsequently poured into 700 parts f ice water and the suspension thus obtained was subequently added dropwise to a boiling solution of 35 arts of copper sulfate in 238 parts of water and 12.5 arts of concentrated sulfuric acid. The reaction product vhich had precipitated, was cleaned by boiling with odium hydroxide solution of 5% strength after having een isolated according to usual methods, and the alkalinsoluble residue was recrystallized from dimethylformimide. The compound thus obtained was identical with he dyestuff described in Example 1.

*Example 4*

10.4 parts of Bz-1-(2'-amino-4'-5'-dimethylphenyl-mercapto)-Bz-2-isopropyl-1.9-benzanthrone were suspended in 40 parts of glacial acetic acid, were heated to 70–80° C. and converted into the hydrochloride by adding 6.5 parts of concentrated hydrochloric acid. The hydrochloride was then diazotized with a solution of 1.8 parts of sodium nitrite in 30 parts of water at 0–5° C. Subsequently, the batch was diluted with 40 parts of water and the diazonium suspension thus obtained was stirred into a boiling solution of 25 parts of copper sulfate in 350 parts of water. After working up in usual manner, there was obtained a red dyestuff powder which yielded orange fluorescing dyeings on polystyrene and polymethacrylate material.

*Example 5*

9.6 parts of Bz-1-(2'-amino-4'-chlorophenyl-mercapto)-1.9-benzanthrone were diazotized and cyclizised in the manner described in Example 4. The red dyestuff powder obtained dyed polystyrene and polymethacrylate material orange-red fluorescing tints of good fastness to light.

*Example 6*

17.1 parts of Bz-1-(2'-aminophenyl-mercapto)-Bz-2-phenyl-1.9-benzanthrone were suspended in 200 parts of glacial acetic acid and converted into the hydrochloride at 70° C. by adding 10 parts of concentrated hydrochloric acid. After dilution with 40 parts of water and diazotization with a solution of 3 parts of sodium nitrite in 40 parts of water, the diazonium suspension was stirred into a boiling solution of 40 parts of copper sulfate in 700 parts of acetic acid of 10% strength. After usual working up, there was obtained a dyestuff which yielded orange-red fluorescing dyeings on polystyrene structures.

*Example 7*

13 parts of concentrated hydrochloric acid were added to a mixture of 21.6 parts of Bz-1-(2'-aminophenyl-mercapto)-6-bromo-1.9-benzanthrone and 80 parts of glacial acetic acid at 80° C., the whole was stirred for 15 minutes and subsequently diluted with 80 parts of water. The hydrochloride obtained was diazotized with the stoichiometrical amount of sodium nitrite solution of 10% strength and the diazonium suspension was treated with boiling copper sulfate solution in the manner described in the above examples. The dyestuff obtained yielded brilliant red-orange fluorescing dyeings of very good fastness to light and very good stability to high temperatures of polystyrene and polymethacrylate material.

The following table comprises further orange dyestuffs which are obtained according to methods described in the above examples:

(1) 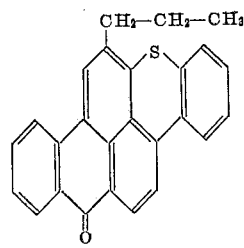

(2) 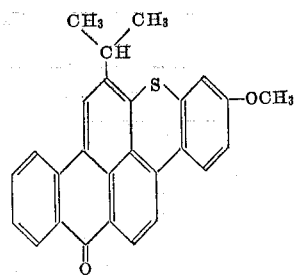

(3) 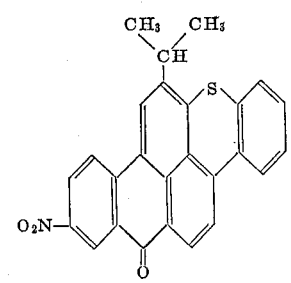

(4) 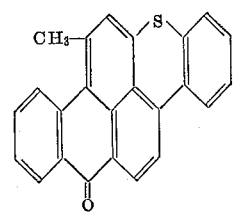

(5) 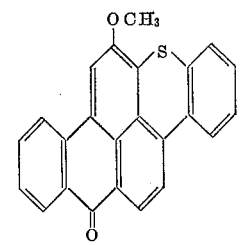

(6) 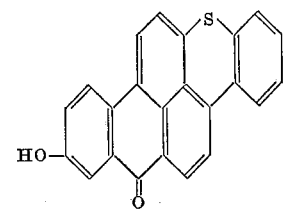

(7) 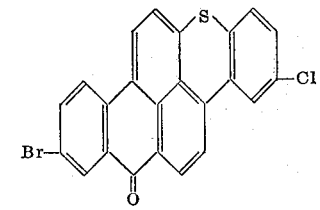

We claim:
1. A dyestuff of the formula

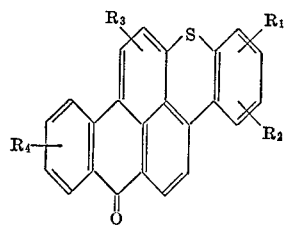

in which $R_1$ and $R_2$ represent hydrogen, chlorine, lower alkyl or lower alkoxy, $R_3$ stands for hydrogen, lower alkyl, lower alkoxy or phenyl and $R_4$ stands for hydrogen, bromine, nitro or hydroxy.

2. The dyestuff of the formula

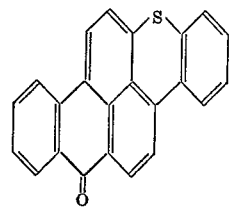

3. The dyestuff of the formula

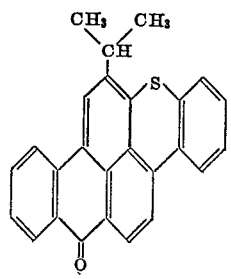

4. The dyestuff of the formula

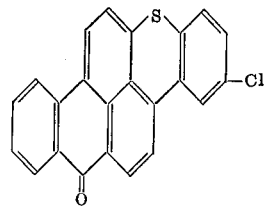

5. The dyestuff of the formula

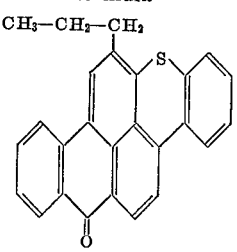

6. The dyestuff of the formula

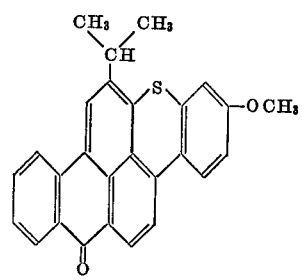

References Cited

Houben-Weyl: Methoden der Org. Chem. Stickstoff Verbindungen I, Teil 3, pp. 202–6 (1965).

WALTER A. MODANCE, *Primary Examiner.*

C. M. SHURKO, *Assistant Examiner.*